Jan. 26, 1943. C. F. M. VAN BERKEL 2,309,554
SLICING MACHINE
Filed May 4, 1940 4 Sheets-Sheet 2
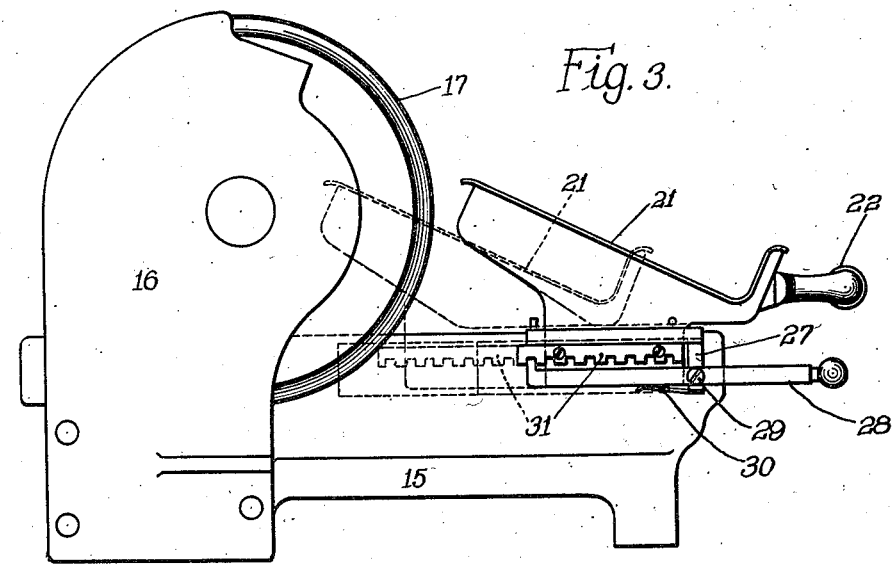
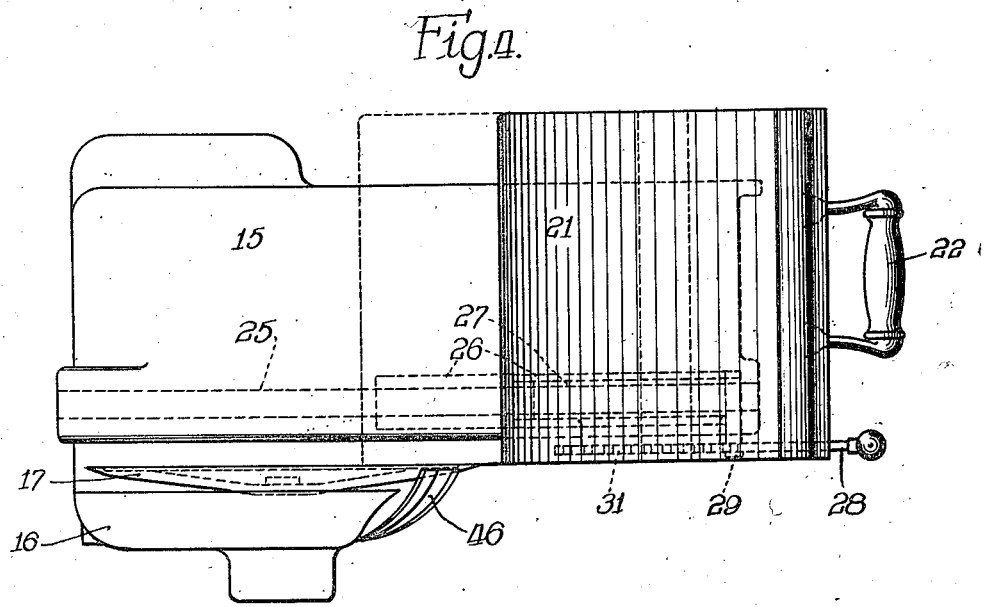
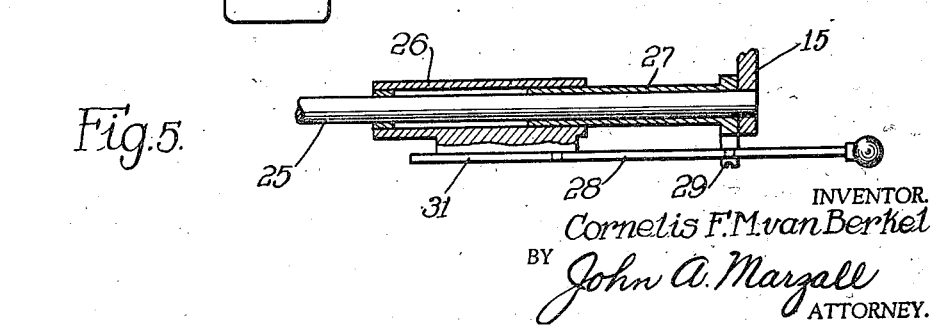
INVENTOR.
Cornelis F.M. van Berkel
BY John A. Marzall
ATTORNEY.

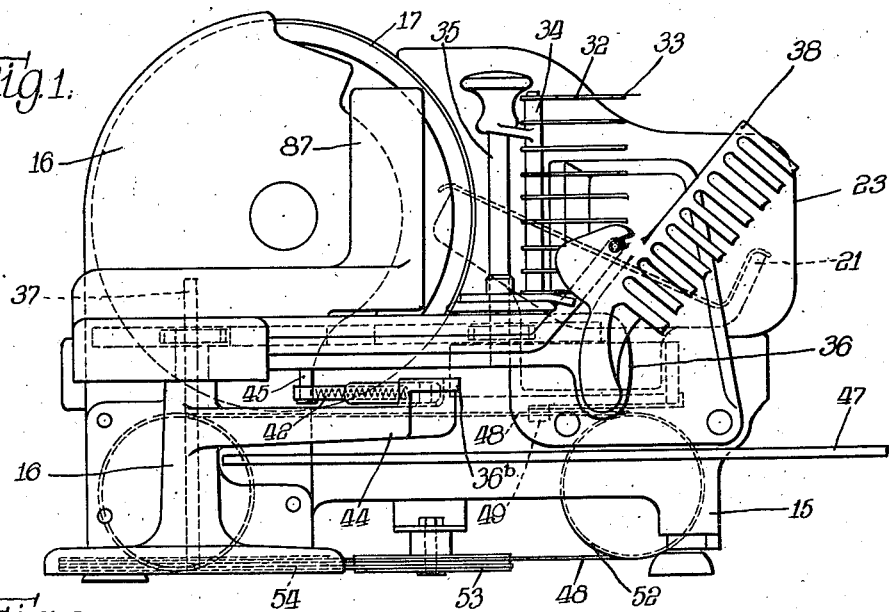

INVENTOR.
Cornelis F. M. van Berkel
BY John A. Marzall
ATTORNEY.

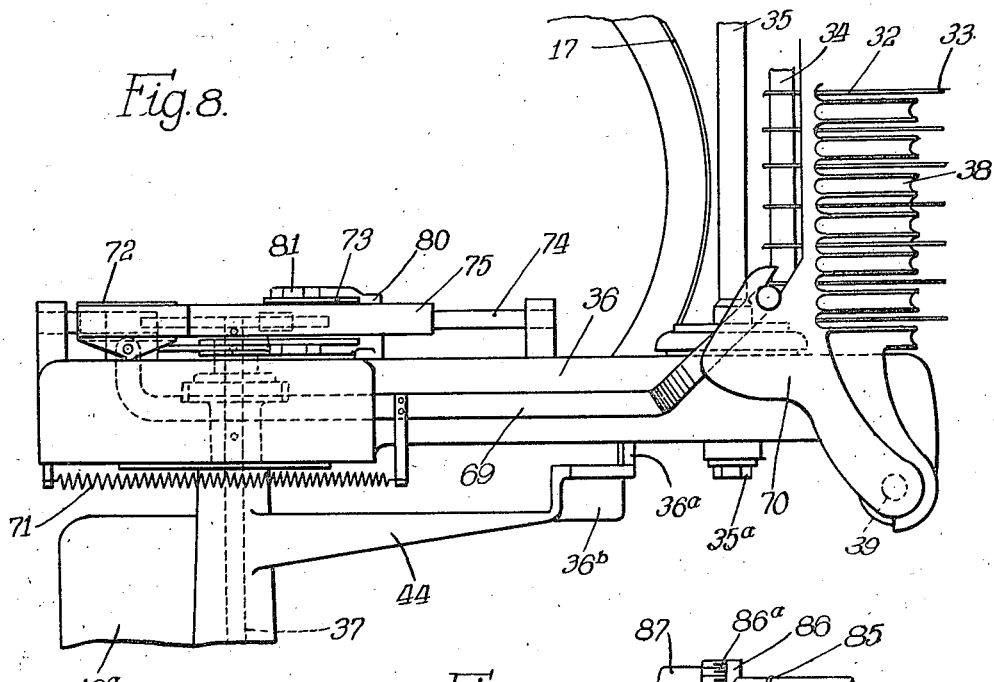

Patented Jan. 26, 1943

2,309,554

UNITED STATES PATENT OFFICE 2,309,554

SLICING MACHINE

Cornelis F. M. Van Berkel, Wassenaar, Netherlands, assignor to U. S. Slicing Machine Company, La Porte, Ind., a corporation of Indiana Application May 4, 1940, Serial No. 333,404
In Great Britain August 23, 1939

26 Claims. (Cl. 146—94)

This invention relates to slicing machines and particularly to slicing machines of the "push-pull" type, that is, machines having an electrically driven knife and having a manually operated carriage which is manually moved back and forth in a rectilinear path. More specifically, the invention relates to a "push-pull' slicing machine having slice stacking mechanism operating in conjunction with a slice discharge fly.

An important object of the present invention is the provision of a slicing machine which is provided with means to adjust the slice conveyor in relation to the slicing plane of the machine in accordance with the thickness of slices to be cut, the adjustment of the conveyor being made in unison with the slicing machine gauge plate.

Another important object of the invention is the provision of a slicing machine having a slice conveyor and a discharge fly mounted on an adjustable bracket, the adjustable bracket being automatically adjustable in accordance with the thickness of the slice to be cut, the adjustment of the conveyor with respect to the slicing plane being made without in any way affecting the relationship between the conveyor and its cooperating slice discharge fly.

Another object of the invention is the provision of a slicing machine having slice stacking mechanism which is adapted to be displaced, whereby the machine is rendered operable and suitable for direct positioning of the slices on a slice receiver without use of the slice stacking mechanism and without need of disconnecting the stacking operating mechanism.

A further object of the invention is the provision of a slicing machine of the "push-pull" type, wherein the carriage is provided with a variable stroke at the will of the operator to suit the size of the substance being cut, the operation of the slice conveyor and its associated discharge fly being operable to effect slice impaling and slice discharging regardless of the variation of the stroke of the carriage.

A still further object of the invention is the provision of a slicing machine having a carriage whose stroke is variable and whose stacking mechanism is adapted to be brought to unvarying slice discharge position despite variations in the stroke of the carriage.

Another object of the invention is the provision of a slicing machine which is provided with new and improved means to magnify the speed of the conveyor at a predetermined time or interval, both during the cutting operation and during the return stroke of the carriage so that the positioning of the conveyor will always be proper with respect to the position of the carriage.

Still another object of the invention is the provision of a conveyor drive means with means for magnifying the speed of the conveyor in relation to the speed of the carriage while the carriage is approaching and returning from the zone in which it takes successive slices as the slices are being cut, the drive being such that the conveyor moves in harmony and in proper synchronism with the carrier during the slice receiving action.

A still further object of the invention is the provision of new and improved means for imparting a quick slice discharging action to the slice discharge fly and to absorb the shock of such action.

Still another object of the invention lies in the provision of a slice conveying and discharge fly mechanism which is adapted to be mounted on an element movable toward and away from the slicing zone so that the machine is applicable for use either with or without a slice conveying and discharging mechanism.

Numerous other objects and advantages will be apparent throughout the progress of the following specification.

The accompanying drawings illustrate a selected embodiment of the invention and the views therein are as follows:

Fig. 1 is a detail elevational view of a slicing machine and embodying the invention;

Fig. 2 is a detail plan view of the machine shown in Fig. 1;

Fig. 3 is a detail elevational view similar to Fig. 1 but with some of the stacking mechanism removed for the sake of clearness;

Fig. 4 is a detail plan view of the machine shown in Fig. 3;

Fig. 5 is a detail sectional view showing the means for affecting the stroke of the carriage to make it variable;

Fig. 8 is a detail elevational view similar to Fig. 1 but showing in greater detail some of the mechanism for operating the discharge fly;

Fig. 9 is a detail plan section of the structure shown in Fig. 8;

Fig. 10 is a detail sectional view on the line 10—10 of Fig. 9.

Figure 6:
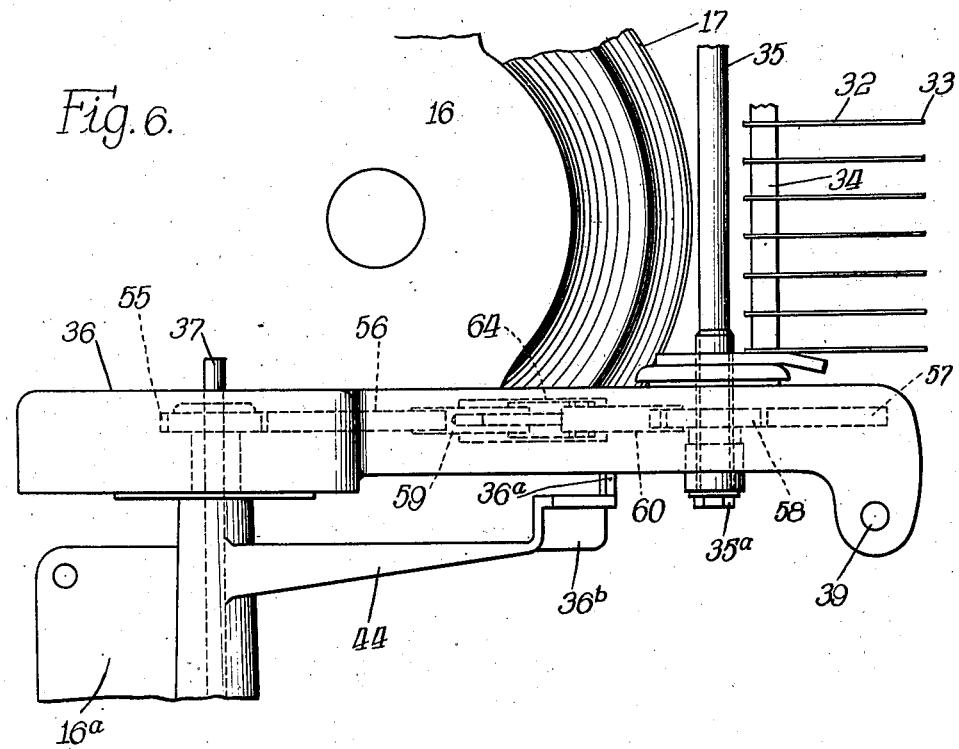
Fig. 6 is a detail elevational view similar to Fig. 1 but showing in greater detail the conveyor and some of its associated mechanism.

The particular slicing machine herein shown for the purpose of illustrating the invention comprises a stationary base or support 15 to which there is operatively connected an upright knife supporting bracket 16. A knife 17 is operatively and rotatably mounted on the knife supporting bracket 16, being driven by an electric motor 18, Fig. 2, which is housed within the base 15.

The shaft 19 of the motor 18 is operatively connected by transmission mechanism 20 to operate the knife.

The substance to be sliced is mounted on the carriage or carrier 21 which is adapted to be reciprocated past the knife in a rectilinear path. A handle 22 may be fastened to the carriage 21 so that the carriage may be manually reciprocated. The substance to be cut may be fed perpendicular to the slicing plane of the knife in any way desired, either manually or by a spring urged pusher plate in a manner well known in the art. The thickness of a slice of substance to be cut is controlled by a gauge plate 23 whose active face lies in a plane parallel to the slicing plane of the knife. The gauge plate 23 is adapted to be manually adjusted to vary the thickness of a slice to be cut by any conventional mechanism, indicated generally by the numeral 24, whereby the space between the slicing plane and the plane of the gauge plate determines the thickness of the slice to be cut.

The carriage 21 is adapted to be reciprocated along suitable guide means including a guide bar 25 which is supported by the base 15. A sleeve 26 is rigidly secured to the carriage 21 and has telescoping engagement with a sleeve 27 on the bar 25. The construction is such that the inner sleeve 27 has a sliding fit on the bar 25, while the sleeve 26 on the carriage is slidably adjustable on the inner sleeve 27. A latch lever 28 is fulcrummed at 29, Fig. 5, on the inner sleeve 27 and is urged by a spring 30 so that the latch lever 28 will engage a toothed rack 31 on the outer sleeve 26, Fig. 3. This latch lever 28 serves to lock the sleeve 26 and the carrier 21 in adjusted position with respect to the sleeve 27. The sleeve 27 is adapted to abut against the adjacent portion of the base 15, Fig. 5, at the end of each full stroke of the carriage 21. The position of the sleeve 27 with respect to the base 15 is constant but the position of the carrier 21 with regards to the sleeve 27 is variable to the extent of the range of adjustment permitted by the rack 31 so that the movement of the carriage to perform the slicing stroke and the return of the carriage from the slicing stroke can be shortened or lengthened depending upon the size of the substance to be sliced. In Fig. 3, the normal or full range of movement of the carriage toward the operator is shown in full lines, while the dotted line position shows the end of movement of the carriage toward the operator when relatively small substances are to be cut. In a forward direction, that is away from the operator and at the end of the cutting stroke, the outer sleeve 26 is adapted to abut against a stop, not shown, at the end of the bar 25. The length of the stroke of the carriage, therefore, is limited by the sleeve 26 striking a bumper at the forward end of the rod 25, while the return movement of the carriage is limited by the end of the sleeve 27 striking a part of the frame in the manner shown in Fig. 5. The construction is such, therefore, that the operator can freely vary the stroke to suit the size of substance being sliced. The operator is also free to adjust the termination of the return stroke as required by the size of the substance. Therefore, no matter to what degrees the slicing and return strokes of the carriage may be varied, the inner sleeve 27 always returns to a position which remains constant. Therefore, the machine is particularly adaptable for use in connection with slice stacking mechanism of the "push-pull" type having a carriage whose movement may be made variable.

Slice stacking mechanism which can be conveniently used with a "push-pull" slicing machine having a carriage with a variable stroke includes a conveyor 32 having vertically spaced horizontal rows of slice impaling prongs 33. The prongs 33 are adapted to be supported on a structure 34 which is detachably connected to a vertical drive shaft 35, Fig. 1. The shaft 35 is journaled in a stacker bracket 36 which is freely pivotable about a vertical shaft or axis 37. The vertical shaft 37 may be suitably journaled in a bracket 16a on the knife supporting bracket 16.

The stacking mechanism also includes a discharge fly 38 which is arranged adjacent the conveyor 32, being pivotally mounted on the same stacker bracket 36. The discharge fly 38 is detachably secured to a pivot pin 39 journaled in the bracket 36 and is detachable from the mechanism which operates it. The bracket 36 is adjustable and may be moved from its operative position shown in full lines in Fig. 2, to an inoperative position shown in dotted lines in that figure. The precise setting of the stacker bracket 36 in the operative position is determined by the gauge plate 23. This stacker bracket is adapted to abut against the part 40 of the gauge plate of the machine. The stacker bracket 36 includes an outwardly projecting member 41 which engages the part 40 of the gauge plate. If desired, this member or projection 41 may have its outer end formed of flexible material such as rubber. A compression spring 42 has one of its ends connected at 43 to a stationary bracket 44 and its other end connected to a pin 45 on the underside of the bracket 36. This spring, therefore, urges the bracket 36 to engage a part of the gauge plate and is movable during adjustable movement of the gauge plate. Thus, when the gauge plate is adjusted in accordance with the thickness of the slice to be cut, the bracket 36 is adjusted similarly. As the discharge fly 38 is also mounted on the bracket 36, the conveyor and discharge fly will maintain an unchanged operative position with respect to each other. The stacker bracket 36 is provided with a bearing member 36a on its underside which rests on and is slidable upon an arcuate rail 36b formed on the bracket 44, Figs. 6 and 8.

The knife bracket 16 is provided with a slice pressing guide plate 46 which serves to press each slice as it is being cut onto the conveyor prongs 33. This plate 46, therefore, causes the slice as it is being cut to be impaled on the prongs. This plate 46 does not need to be adjustable but it may be pivotally connected to a part of the knife supporting bracket to permit quick and easy cleaning of the knife, Figs. 2 and 4.

The spring device 42 also serves to maintain the stacker bracket 36 in inoperative position with respect to the slicing machine, as shown in dotted lines in Fig. 2. In this latter position the slicing machine may be utilized as an ordinary slicer without any stacker mechanism, the slices being deposited directly upon the slice receiving platform 47 in the usual way. The slice conveyor and the discharge fly are adapted to be detached and removed from the stacker bracket 36, and the shaft 35 may be removed entirely by merely unscrewing a nut 35a arranged underneath the stacker bracket 36, as clearly shown in Figs. 6 and 8.

The conveyor 32 is adapted to be operated forwardly and rearwardly by the carriage 21. This conveyor is driven by the movement of the carriage, the drive being such that throughout the slice engaging action, the prongs 33 will move at a linear speed in precise harmony with that of the carriage. This drive is also characterized in that the prongs 33 will move toward and return from slice impaling position at a speed magnified over the speed of the carriage. The conveyor, therefore, leads the carriage. The conveyor 21, therefore, moves in one direction at least as far as full registration with the slice impaling guide 46 even when the carriage is given its shortest slicing stroke and moves in the return direction to a constant position of registration with the discharge fly 38. In this latter position the conveyor faces a direction parallel to the return stroke of the carriage, and the discharge fly is adapted to operate with unrestricted scope and without any obstruction by any of the associated parts.

The drive for the conveyor mechanism preferably includes an endless cable or belt 48 which is adapted to be attached at 49 to the inner sleeve 27 which at the end of each return stroke of the carrier reaches the constant terminal position illustrated in Fig. 5. The driving member 48 is adapted to pass around a series of pulleys including a pulley 50 which is freely journaled to the motor bearing 51. The driving cable or belt 48, Fig. 2, also passes around the vertical pulley 52 and two horizontal pulleys 53 and 54. The pulley 54 is adapted to be operatively secured to the previously mentioned shaft 37 which also is operatively connected to the conveyor shaft 35 by means of transmission mechanism shown in Figs. 6 and 7.

The transmission mechanism comprises a pinion 55 which is mounted on the shaft 37, a reciprocal rack 56 which meshes with the pinion 55, a second reciprocal rack 57, a periodically active motion-magnifying gear interconnecting the racks 56 and 57 and a pinion 58 on the shaft 35. The pinion 58 is adapted to mesh with the rack 57. When the motion-magnifying gear is inactive, it slowly couples the two racks 56 and 57 together, Fig. 7, causing the shaft 35 to be rotated to and fro at a predetermined speed such that the impaling prongs 33 will move in harmony with the carrier 21, while the conveyor is rotating through the slice impaling period. When this motion-magnifying gear is active, it magnifies the motion of the rack 57 in relation to that of the rack 56 so that the shaft 35 will be rotated at a speed such that the prongs 33 will lead the carrier. The motion-magnifying gear is timed to perform this magnifying action for a period at the commencement of each slicing and return stroke.

The said motion-magnifying mechanism comprises the telescopically related parts 59 and 60 which are secured to the racks 56 and 57 respectively. A lever 61 is pivotally connected to the element 59 and to the element 60 by means of a pin and slot connection 62, Fig. 7. A guide rod 63 is secured to the stacker bracket 36 and a slide block 64 on the rod 63 has a pin and slot connection to the lever 61 as indicated at 65. Two oppositely disposed spring urged tilting rings or collars 66 and 67 which embrace the rod 63 are mounted in the block 64 and are adapted individually, one at a time, to bite into the rod 63 and thus lock the block to the rod. The rings 66 and 67 constitute one-way clutches.

Figure 7:
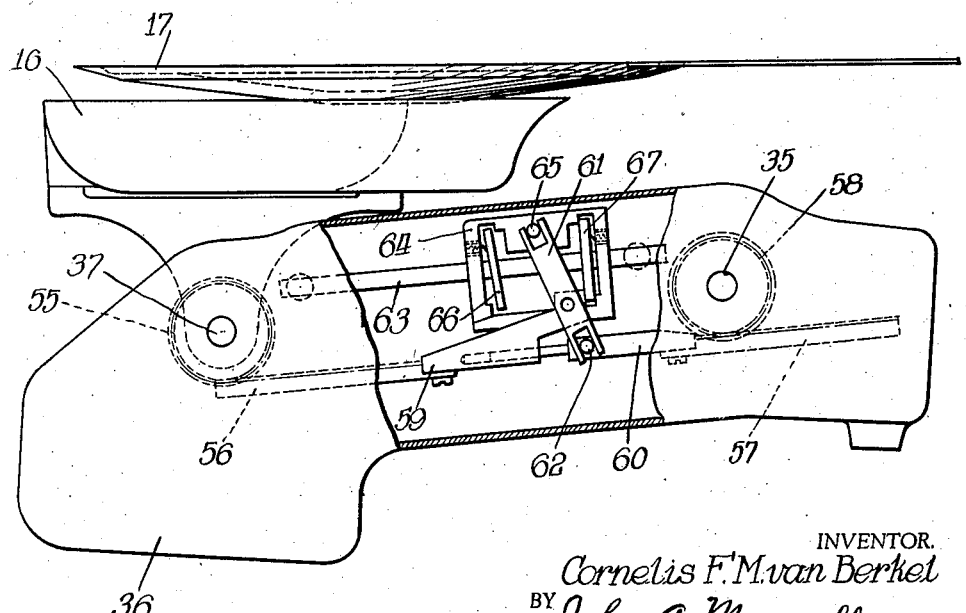
Fig. 7 is a detail plan view of the structure shown in Fig. 6.

In Fig. 7, the mechanism is shown in a position in which the carrier 21 has already performed a portion of its return stroke. In this position the pinion 55 is moving in a clockwise direction to drive the racks 56 and 57 to the left and thus turn the conveyor clockwise, that is, to perform its return motion to discharge position. The ring 67 is free throughout this direction of movement, but for the time being the ring 66 bites into the bar 63 and thus locks the block 64. The lever 61, therefore, fulcrums about the connection 65 and pulls the rack 57 at a speed greater than the rack 56, whereby the motion-magnification is performed. This magnification continues until the element 59 contacts with and unlocks the ring 66, whereupon the elements 59 and 60 will have become fully closed. Thereafter, the entire assembly of movable parts 59—62 and 64—67 will move as a single unit, whereby there will be no further motion-magnification. During reversal of the pinion 55 to effect the next slice taking motion of the conveyor, a corresponding sequence of events occurs. The ring 66 will be free and the ring 67 biting into the bar 63 until the ring is freed by the element 59 which is now moving toward the right, Fig. 7. The parts are so designed that the block 64 will become free and the motion-magnification ended when the leading slice impaling prongs 33 reach slice impaling position.

The discharge fly 38 is operated in timed relationship with the conveyor 32 by cam and brake mechanism adapted to effect a sharp downward pivotal motion of the fly about the pin 39 at the end of the conveyor's return motion. The sharp motion of the fly is braked by progressively increasing resistance towards its end so as to effect a smooth upward return motion of the fly, Figs. 8-10. This mechanism may comprise a strong spring 68 on the pin 39 and tends to urge continuously the fly 38 toward its lowermost position, Fig. 1. The urging action of the spring 68 is controlled by the two sets of cam devices acting through a link 69 which is detachably connected at 70 to the fly 38 and is pulled toward the left, Fig. 8, by a spring 71 which is relatively weak in comparison with the spring 68. The link 69 is also connected to one of two slide blocks 72 and 73 which are mounted on a guide rod 74 secured to the stacker bracket 36. Two fork-like blade springs 75 form a yielding connection between the blocks 72 and 73 and serve as a shock absorbing brake with respect to the relative motion between the two blocks 72 and 73, Fig. 9.

One of the sets of cam devices includes a disc 76 secured to the shaft 37 and formed with a cam groove 77, including a "drop" 78. The follower of this cam is a roller 79 on a lever 80 which is fulcrummed on the bracket 36 and has a pivotally slidable connection at 81 with the block 73 engaged between the brake springs 75. The other set of cam devices includes a collar 82 also secured to the shaft 37. This cam 82 rocks a lever 83 fulcrummed at 84 in the bracket 36, Fig. 10, and pulled against the cam by a spring 85. The base 86 of the lever 83 is cut away as indicated at 86a and cooperates with a detent 87 on the block 72 which carries the brake springs 75.

The fly 38 is adapted to be maintained in its upright position, Figs. 8 and 9, by the cam boss 86 against the action of the spring 68. As soon as the shaft 37 reaches the end of its clockwise rotation, that is, at the end of the return of the carriage 21 and the conveyor 32, the cam drop 78 reaches the roller 79 and the camway 86a reaches the detent 87, so that the fly is freed to snap downwards under the action of the spring 68. As this quick motion takes place, the block 72, which is directly pulled to the right by the fly, forces the block 73 to move with it, but the lever 80 and cam drop 78 eventually act to restrain the motion of the block 73, and so the springs 75 act as a shock absorbing brake against the block 72 on the fly 38. The fly 38, therefore, is brought smoothly to rest at the end of its slice discharging motion. The cam surface 78a opposite the drop 78 serves to return the fly 38 to its upright position through the intermediary of the lever 80, block 73, spring 75, block 72 and link 69.

The arcuate zone in which the conveyor 32 works is partly enclosed by a shield 88 mounted upon the stacker bracket 36 to move in unison therewith, Fig. 2.

*Operation*

In operation, the operator sets the gauge plate 23 to the thickness of the slice desired, whereby the conveyor will be automatically adjusted corresponding to the slice thickness. The operator then sets the latch 28 to suit the size of the substance to be cut. The carriage 21 is then pushed toward slicing position, whereupon the conveyor 32 will be driven so that its prongs 33 will first move at a speed greater than the movement of the carriage until the prongs reach slice impaling position, at which time they will move at the same speed as the speed of the carriage. The movement of the conveyor during the remainder of the slice receiving stroke will be in harmony with the speed of the carriage. The slice discharging fly 38 will then be raised to its upright position during an initial portion of the slicing stroke. When the operator pulls the carriage rearwardly, the conveyor will return initially at a magnified speed and then later assume the same speed as the speed of the carriage. When the carriage reaches the end of its return stroke, at which point the inner sleeve 27 will be abutting against the base 15, Fig. 5, the conveyor will register with the fly 38. When this registration takes place, the slice discharging action of the fly will occur with a snap action, but will be later absorbed by the springs 75. During continued movement to and from slicing position, the various cycles of operation will be repeated.

The invention, therefore, provides a slicing machine wherein the carriage may have its stroke lengthened or shortened depending upon conditions and the size of the material to be cut. The variable movement of the carriage controls means or mechanism to effect operation of stacking mechanism which includes a slice conveyor and a slice discharge fly. The mechanism for operating the conveyor and fly is adapted to perform the complete functions regardless of the length of the carriage movement. When the carriage is giving a short stroke, the movement of the conveyor is speeded up to slice impaling position, at which time it operates at the same speed as the carriage. Upon return movement of the carriage, the conveyor is first speeded up and then reduced to the normal speed of the carriage. The slice stacking mechanism is adapted to be shifted according to the thickness of a slice of substance to be cut. Shifting of the conveyor is accomplished by the operation or setting of the gauge plate. The discharge fly is adapted to operate with a forward snap action but the action is snubbed near the end of its movement so as to absorb all shock. Moreover, the slice stacking mechanism is mounted on a movable member which can be swung clear of the rest of the mechanism of the machine, whereby the machine is adapted to operate in a conventional manner by discharging the slices on a slice support.

Changes may be made in the form, construction and arrangement of parts without departing from the spirit of the invention or sacrificing any of its advantages, and the right is hereby reserved to make all such changes as fairly fall within the scope of the following claims.

The invention is hereby claimed as follows:

1. A slicing machine comprising a main frame, a carriage movable in a rectilinear path across the frame, a knife and means to rotate the knife carried by said main frame, a gauge plate and means carried by the main frame for moving the gauge plate in a plane parallel to the cutting plane of the knife to determine thicknesses of slices to be cut, stacking mechanism for stacking slices to be cut, an auxiliary frame member, means for operatively supporting said stacking mechanism on said auxiliary frame member, and means separate from said supporting means for pivotally mounting said auxiliary frame member on said main frame, said last named means providing for shifting the said auxiliary frame member about an axis substantially parallel with the cutting plane of the knife thereby to move the entire stacking mechanism including said supporting means as a unit from an operative position with respect to said knife to a remote inoperative position with respect to the knife while maintaining said gauge plate effective to determine thicknesses of slice.

2. A slicing machine comprising a frame, a carriage movable in a rectilinear path across the frame, a knife and means to rotate the knife, a gauge plate and means for moving the gauge plate in a plane parallel to the cutting plane of the knife to determine thicknesses of slices to be cut, stacking mechanism for stacking slices as they are cut, means independent of said gauge plate for mounting said stacking means on said frame and providing for moving said stacking means to an inoperative position with respect to said knife, and means cooperating with the gauge plate and movable therewith for normally moving the stacking mechanism a distance equal to the movement of the gauge plate to normally maintain said mechanism in proper operative positioning with respect to said knife.

3. A slicing machine comprising a main frame, a substance support reciprocal along the frame, a knife and means for operating the knife to cut slices from substance on the substance support, a gauge plate against which the substance engages carried by said main frame, means for moving the gauge plate toward and away from the cutting plane of the knife according to the thickness of substance to be cut, slice stacking mechanism, means for operatively supporting said stacking mechanism on said auxiliary frame member, means separate from said supporting means for mounting said auxiliary frame member on said main frame for independent pivotal movement about an axis substantially parallel with said cutting plane, means for normally effecting movement of said auxiliary frame member about said axis in accordance with movement of the gauge plate to normally maintain said stacking mechanism in proper operative positioning with respect to said knife, and said last named means in cooperation with said mounting means providing for swinging said auxiliary frame member about said axis to move the entire stacking mechanism including said supporting means to an inoperative position with respect to said knife.

4. A slicing machine comprising a main frame, a substance support reciprocal along the frame, a knife and means for operating the knife to cut slices from substance on the substance support, a gauge plate adjustable on said main frame to and from the slicing plane of the knife to determine the thickness of slices to be cut, stacking mechanism including a slice conveyor, an auxiliary frame member, means for operatively supporting said stacking mechanism on said auxiliary frame member, means separate from said supporting means for movably mounting said auxiliary frame member on said main frame and providing for moving the auxiliary frame member to move the entire stacking mechanism including said supporting means from an operative position with respect to said knife to a remote inoperative position while maintaining said gauge plate effective to determine thicknesses of slice, and means operative when the stacking mechanism is in said operative position for effecting movement of said auxiliary frame and the stacking mechanism supported thereon in accordance with the adjustment of the gauge plate.

5. A slicing machine comprising a main frame, a substance support reciprocal along the frame, a knife and means for operating the knife to cut slices from substance on the substance support, a gauge plate adjustable to and from the slicing plane of the knife to determine the thickness of slices to be cut, slice stacking mechanism, an auxiliary frame member, means for operatively supporting said stacking mechanism on said auxiliary frame member, pivotal means separate from said supporting means for mounting said auxiliary frame member on said main frame and providing for moving said auxiliary frame member about said pivot to swing the entire stacking mechanism including said supporting means from an operative to an inoperative position with respect to said knife, and drive means for operating said stacking mechanism in accordance with movement of said substance support, said drive means including a shaft rotatably supported in said pivotal means thereby to provide for said movement of the auxiliary frame member and the stacking mechanism supported thereon without disconnection of said drive means for said mechanism.

6. A slicing machine comprising a main frame, a substance support reciprocal along the frame, a knife and means for operating the knife to cut slices from substance on the substance support, a gauge plate adjustable to and from the slicing plane of the knife to determine the thickness of slices to be cut, stacking mechanism including a slice conveyor and a discharge fly for discharging slices from the conveyor, an auxiliary frame member, means for operatively supporting said stacking mechanism on said auxiliary frame member, pivotal means separate from said supporting means for mounting said auxiliary frame member on said main frame and providing for moving said auxiliary frame member about said pivot to swing the entire stacking mechanism including said supporting means from an operative position with respect to said knife, and drive means for operating said conveyor and said discharge fly in accordance with movement of said substance support, said drive means including a shaft rotatably supported in said pivotal means thereby to provide for said movement of the auxiliary frame member and the stacking mechanism supported thereon without disconnection of said drive means for said conveyor and said fly.

7. A slicing machine including a knife acting in a slicing plane, a substance support having relative movement with respect to said knife, and a slice-thickness gauge, a bracket, means for pivotally mounting said bracket on a part of said machine, a conveyor journalled in said bracket and movable from a slice-taking position adjacent said knife to a slice-discharge position, a discharge fly pivotally mounted in said slice-discharge position and on said bracket, drive means for operating said conveyor and said discharge fly in accordance with relative movement of said substance support and said knife, and means including said pivotal mounting of said bracket for normally adjusting said gauge and bracket in unison relative to said slicing plane and providing for moving said conveyor and discharge fly to an inoperative position with respect to said knife without disconnecting said drive means.

8. A slicing machine comprising a knife acting in a slicing plane, a carrier for a substance to be sliced, said carrier and knife being relatively movable to effect a slicing operation, a substance-abutting gauge mounted in association with said knife, means for adjusting said gauge in relation to said plane to vary the thickness of slices cut from the substance by said knife, a conveyor mounted for rotary movement about an axis normally to take cut slices in succession to a slice-discharge position, supporting means for said conveyor, means mounting said supporting means for pivotal movement about an axis spaced from and substantially parallel with said conveyor axis, means providing an operative connection between said gauge and said conveyor supporting means for adjusting said conveyor about said last named axis in unison with adjustment of said gauge relatively to said plane, and said connection means providing for movement of said conveyor supporting means about said last named axis to move the supporting means and conveyor to an inoperative position with respect to said gauge and knife.

9. A slicing machine comprising a frame, a substance support reciprocal along the frame, a knife and means for operating the knife to cut slices from substance on the substance support, a gauge plate adjustable to and from the slicing plane of the knife to determine the thickness of slices to be cut, a bracket pivotally mounted on a part of the slicing machine frame and adapted for engagement with a part of the gauge plate, spring means for urging the bracket against said part of the gauge plate, and a slice conveyor journaled on said bracket, and means to operate said conveyor.

10. A slicing machine comprising a frame, a substance support reciprocal along the frame, a knife and means for operating the knife to cut slices from substance on the substance support, a gauge plate adjustable to and from the slicing plane of the knife to determine the thickness of slices to be cut, a bracket pivotally mounted on a part of the slicing machine frame and adapted for engagement with a part of the gauge plate, spring means for urging the bracket against said part of the gauge plate, and a slice conveyor journaled on said bracket, means for operating said conveyor to slice receiving position and then to slice discharging position, and a discharge fly pivotally mounted on said bracket and disposed in said slice discharging position to discharge slices from said conveyor.

11. A slicing machine comprising a knife acting in a slicing plane, a carrier for a substance to be sliced, said carrier being manually movable past the knife by a push-pull operation, a substance-abutting gauge mounted in association with said knife, a bracket associated with said gauge and pivotally mounted for movement about an axis substantially parallel with said gauge and independent of movement of the gauge, a conveyor journaled on said bracket to turn between a slice-taking position adjacent said knife and a slice-discharging position, a discharge fly pivotally mounted on said bracket and disposed in said slice-discharging position, said bracket being pivotable to-and-from said gauge into either of two locations, in one of which the conveyor and fly respectively occupy said slice taking and discharging positions and in the other of which the conveyor and fly respectively are remote from said positions, means for maintaining said bracket in the selected one of said locations, means for adjusting said gauge in relation to said plane to vary the thickness of slices cut from the substance by said knife, and a connection between said gauge and bracket for adjusting said conveyor in unison with said gauge relatively to said plane while permitting movement of said bracket to said remote position.

12. A slicing machine including a knife and a slice-thickness gauge which is adjustable to and from the slicing plane of said knife, stacking mechanism comprising a bracket pivotally mounted for movement about an axis substantially parallel with said slicing plane and normally adjustable in unison with said gauge, a slice conveyor journaled on said bracket, said conveyor being turnable into a slice-discharging position, a discharge fly mounted on said bracket to cooperate with said conveyor, and common means for maintaining said bracket either in contact with a portion of said gauge or displaced from said gauge with said conveyor and fly in an inoperative position.

13. A slicing machine comprising a slicing knife, a substance carrier movable past said knife with variable slicing and return strokes by a push-pull operation, a bar on which said carrier is slidable, a member slidable on said bar for defining the end of the return strokes, means for adjustably connecting said member to said carrier to vary the strokes of the carrier, a slice-taking conveyor journaled adjacent said knife, an operative connection from said slidable member to said conveyor for imparting to-and-fro rotation to said conveyor, and a discharge fly with which said conveyor is registrable at said end.

14. A slicing machine comprising a slicing knife, a substance carrier adapted to perform slicing and return strokes past said knife by a push-pull operation, a member fixed to said carrier, a second member having a telescopic relationship with said first member, an abutment against which said second member abuts at the end of each return stroke, adjustable means interconnecting said first and second members so that said carrier is returnable to a variable extent, a slice-taking conveyor journaled adjacent said knife, an operative driving connection between said second member and said conveyor for imparting to-and-fro rotation to said conveyor, and a discharge fly with which said conveyor is constantly registrable at said end despite variations in the return strokes of the carrier.

15. A slicing machine comprising a slicing knife, a substance carrier adapted to perform slicing and return strokes past said knife by a push-pull operation, a member movable with said carrier, an abutment against which said member abuts at the end of each return stroke, adjustable means interconnecting said carrier and member so that said carrier is returnable to a variable extent, a slice-taking conveyor journaled adjacent said knife, an operative connection between said member and said conveyor for imparting to-and-fro rotation to said conveyor, and a discharge fly with which said conveyor is constantly registrable at said end despite variations in the return strokes of the carrier, said adjustable means comprising a toothed element on one of the components comprising said carrier and said member, and a latch mounted on the other of said components and engageable with said toothed element in a selected position of adjustment.

16. A slicing machine comprising a slicing knife, a substance carrier adapted to perform slicing and return strokes past said knife by a push-pull operation, a member movable with said carrier, an abutment against which said member abuts at the end of each return stroke, adjustable means interconnecting said carrier and member so that said carrier is returnable to a variable extent, a slice-taking conveyor journaled adjacent said knife, an operative connection between said member and said conveyor for imparting to-and-fro rotation to said conveyor, and a discharge fly with which said conveyor is constantly registrable at said end despite variations in the return strokes of the carrier, said adjustable means comprising a toothed element on one of the components comprising said carrier and said member, and a latch mounted on the other of said components and engageable with said toothed element in a selected position of adjustment, said operative connection comprising an endless flexible element connected to said member, pulleys engaged and rotated by said element, and a rack and pinion connection between one of said pulleys and said conveyor.

17. A slicing machine comprising a slicing knife, a substance carrier reciprocable to a variable extent past said knife, a conveyor rotatable between a slice-taking zone and a slice-discharge position, slice-taking elements on said conveyor, a discharge fly operable in register with said elements in said position, transmission means from said carrier to said conveyor and fly for operation of both thereof, said means being designed to operate said conveyor in said zone at a speed such that said elements harmonize with said carrier, and motion-magnifying means interposed in said transmission means to increase, above the carriage speed, the speed at which said elements advance to and return from said zone, said motion magnifying means including a pair of oppositely disposed self-locking one-way clutches.

18. A slicing machine comprising a slicing knife, a substance carrier reciprocable to a variable extent past said knife, a conveyor rotatable between a slice-taking zone and a slice-discharge position, slice-taking elements on said conveyor, a discharge fly operable in register with said elements in said position, transmission means from said carrier to said conveyor and fly for operation of both thereof, said means being designed to operate said conveyor in said zone at a speed such that said elements harmonize with said carrier, and motion-magnifying means interposed in said transmission means to increase, above the carriage speed, the speed at which said elements advance to and return from said zone, a member movable with said carrier, an abutment against which said member abuts at the end of each return stroke, and adjustable means interconnecting said carrier and member so that said carrier is returnable to a variable extent.

19. A slicing machine comprising a slicing knife, a substance carrier manually movable past said knife with variable strokes by a push-pull operation, a conveyor movable into and through and away from a slice-taking zone adjacent said knife, a transmission from said carrier to said conveyor for operation thereof, said transmission including a pair of racks and being designed to move said conveyor through said zone at the same speed as the carrier, and motion-magnifying means interconnecting said racks to move said conveyor towards and to return it from said zone at greater speed than the carrier.

20. A slicing machine comprising a slicing knife, a substance carrier reciprocal past said knife, means for varying the extent of travel of said carrier, a conveyor rotatable between slice-receiving position and slice-discharging position, slice-receiving elements on said conveyor, a discharge fly operable in register with said elements at slice-discharging position, transmission means from said carrier to said conveyor and said discharge fly to operate said conveyor and said fly, said transmission means including a reciprocal rack for rotating the conveyor, said transmission means operating the conveyor at slice-taking position at a speed such that the slice-receiving elements will harmonize with the speed of the carrier, motion-magnifying means interposed in said transmission means to increase above the speed of the carriage the speed at which the elements advance to and return from slice-receiving position, said motion-magnifying means comprising oppositely disposed self-locking one-way clutches, a lever which is active when one of said clutches is locked, an operative connection between said lever and said rack, and an operative connection between said lever and carrier, said latter connection being adapted to unlock said clutches alternately.

21. A slicing machine comprising a slicing knife, a substance carrier reciprocable past said knife, slice-stacking mechanism including a conveyor rotatable to-and-fro, and a transmission from said carrier to said conveyor for operating said conveyor, said transmission including periodically active motion-magnifying means comprising oppositely set self-locking one-way clutches, a motion-magnifying lever which is active when one of said clutches is locked, an operative connection between said lever and the conveyor, and an operative connection between said lever and the carrier, said latter connection being adapted to unlock said clutches alternately.

22. A slicing machine comprising a slicing knife, a substance carrier movable past said knife with variable slicing and return strokes by a push-pull operation, means defining the end of the return strokes, a slice-taking conveyor journaled adjacent said knife, a discharge fly with which said conveyor is registrable at said end, a shaft rotatable to-and-fro for operating said fly, pinions for operating the conveyor, one of said pinions being mounted on said fly operating shaft, racks meshing with the respective pinions, an operative connection from the fly-operating shaft to said carrier, and a connection interposed between said racks and adapted at the commencement of each rotational motion of the conveyor operating pinion to magnify the speed transmitted thereto from the pinion on the fly operating shaft.

23. Slicing machine stacking mechanism comprising a conveyor movable into a slice-discharging position, a discharge fly pivotally mounted in said position, means for moving said conveyor, and means for operating said fly, said fly-operating means comprising spring means urging said fly to perform a slice-discharging operation, two cam devices controlling the action of said spring means, means for turning said cam devices to-and-fro, a detent releasable by the first of said devices to permit said slice-discharging operation of the fly, and a resilient connection between said cam devices to absorb any shock of said operation, the second of said devices being adapted to return the fly to initial position through said resilient connection.

24. Slicing machine stacking mechanism comprising a conveyor movable into a slice-discharging position, a discharge fly pivotally mounted in said position, means for moving said conveyor, and means for operating said fly, said fly-operating means comprising spring means urging said fly to perform a slice-discharging operation, two cam devices controlling the action of said spring means, means for turning said cam devices to-and-fro, a detent releasable by the first of said devices to permit said slice-discharging operation of the fly, and a resilient connection between said cam devices to absorb any shock of said operation, the second of said devices being adapted to return the fly to initial position through said resilient connection, said resilient connection comprising a slide block carrying said detent and connected to the fly, a second slidable block connected to the second cam device, and blade springs attached to the first-named slide block and frictionally engaging said second-named slide block.

25. A slicing machine comprising a frame, a slicing knife, a substance carrier movable past said knife with variable slicing and return strokes by a push-pull operation, a bar on said frame extending parallel with the direction of movement of said carrier, a sleeve-like member slidably mounted on said bar, a second sleeve-like member slidably mounted on said bar and adapted for telescopic interfitting with said first sleeve-like member, means for connecting said second sleeve-like member to said carrier, means for adjustably connecting said two sleeve-like members together, and means on said frame providing an abutment stop for said first sleeve-like member upon return strokes of the carrier.

26. A slicing machine comprising a main frame, slicing means including a knife and substance carrier having relative movement with respect to each other mounted on said main frame, a tray for receiving cut slices, stacking mechanism for normally disposing said cut slices on said tray, a bracket arm, means for operatively supporting said stacking mechanism on said bracket arm, means separate from said supporting means for pivotally mounting said bracket arm on said main frame, said bracket arm and pivotal mounting means providing for normally supporting said stacking mechanism in operative position above said tray, and said bracket arm being swingable about said pivotal mounting means to move the entire stacker mechanism including said supporting means to an inoperative position with respect to said slicing means and said tray.

CORNELIS F. M. VAN BERKEL.